United States Patent [19]

Mauterer

[11] Patent Number: 5,590,707
[45] Date of Patent: *Jan. 7, 1997

[54] HEAT EXCHANGER

[75] Inventor: David Mauterer, Atlanta, Ga.

[73] Assignee: Contaminant Separations, Inc., Atlanta, Ga.

[ * ] Notice: The term of this patent shall not extend beyond the expiration date of Pat. No. 5,452,758.

[21] Appl. No.: 435,362

[22] Filed: May 5, 1995

Related U.S. Application Data

[63] Continuation-in-part of Ser. No. 40,881, Mar. 31, 1993, Pat. No. 5,452,758.

[51] Int. Cl.$^6$ .................................. F28F 9/22; F28F 3/00
[52] U.S. Cl. .............................. 165/145; 165/166
[58] Field of Search .................................. 165/144, 145, 165/166, 153

[56] References Cited

U.S. PATENT DOCUMENTS

| | | |
|---|---|---|
| 1,310,251 | 7/1919 | Russell . |
| 2,184,657 | 12/1939 | Young . |
| 2,341,527 | 2/1944 | Chaney . |
| 2,342,838 | 2/1944 | Brunjes . |
| 2,395,543 | 2/1946 | Gallaher ................................. 165/145 |
| 2,598,116 | 5/1952 | DuBois . |
| 2,765,872 | 10/1956 | Hartman et al. . |
| 2,813,700 | 11/1957 | Schenck, Jr. ............................ 165/145 |
| 2,852,090 | 9/1958 | Kelley . |
| 2,912,749 | 11/1959 | Bauernfeind et al. ............... 165/166 X |
| 2,938,712 | 5/1960 | Pellmyr .................................. 165/145 |
| 3,101,930 | 8/1963 | Huet . |
| 3,395,510 | 8/1968 | Barnes . |
| 3,526,274 | 9/1970 | Gardner ................................. 165/145 |
| 3,634,998 | 1/1972 | Patterson . |
| 3,746,084 | 7/1973 | Ostbo . |
| 3,866,674 | 2/1975 | Tramuta et al. ........................ 165/166 |
| 4,134,450 | 1/1979 | Boyer et al. . |
| 4,202,407 | 5/1980 | Woitowitz ................................. 165/76 |
| 4,274,481 | 6/1981 | Ireland et al. ...................... 165/166 X |
| 4,284,609 | 8/1981 | deVries . |
| 4,364,750 | 12/1982 | Koncz . |
| 4,487,616 | 12/1984 | Grossman . |
| 4,550,775 | 11/1985 | Edwards et al. . |
| 4,606,745 | 8/1986 | Fujita ........................................ 62/42 |
| 4,690,698 | 9/1987 | Reid . |
| 4,924,938 | 5/1990 | Plaschkes . |
| 4,932,334 | 6/1990 | Patte et al. . |
| 5,080,696 | 1/1992 | Marchand et al. . |
| 5,171,557 | 12/1992 | Crosbie et al. . |
| 5,275,233 | 1/1994 | Little ................................. 165/166 X |
| 5,452,758 | 9/1995 | Mauterer ............................... 165/145 |

FOREIGN PATENT DOCUMENTS 380182  5/1922  Germany .

OTHER PUBLICATIONS

Lytron/Alpha United Brochure (Undated).

Primary Examiner—Leonard R. Leo
Attorney, Agent, or Firm—Kennedy & Kennedy

[57] ABSTRACT

A heat exchanger (10) for extracting thermal energy from a process fluid, comprising a first group of at least one plate-fin heat exchange module (34a) and a second group of at least one plate-fin heat exchange module (34b). Each plate-fin heat exchange module (34) includes an inlet (72), an outlet (74) and a plurality of spaced-apart plates (60) for communicating a refrigerant fluid in a cross-direction to a process fluid. The modules (34) are sequenced alternately with one of the modules (34a) of the first group adjacent one of the modules (34b) of the second group. The modules (34) are disposed so that the refrigerant fluid flows in a first direction through the modules (34a) of the first group and flows in a second opposite direction through the modules (34b) of the second group. A supply header (38) connects to the inlets (72) of each heat exchange module (34) in parallel for communicating the refrigerant fluid from a supply to the heat exchange modules. A discharge header (40) connects to the outlet (74) of each heat exchange module (34) for communicating the refrigerant fluid from the heat exchange modules to the supply.

2 Claims, 3 Drawing Sheets

HEAT EXCHANGER

This application is a continuation-in-part of U.S. patent application Ser. No. 08/040,881 filed Mar. 31, 1993 now U.S. Pat. No. 5,452,758.

TECHNICAL FIELD

The present invention relates to heat exchangers. More particularly, the present invention relates to an apparatus and method for cooling a process fluid with a refrigerant fluid.

BACKGROUND OF THE INVENTION

Many mechanical devices and processes generate heat. Fluids are typically used in the apparatus or in the process to absorb the heat. Heat exchangers are then used to cool the process fluid so that the apparatus and the process operate in an appropriate range of temperatures. For example, applications requiring transfer of heat from a process fluid to a refrigerant fluid include computers, laser equipment, medical equipment, automobiles, air conditioning, waste and process heat recovery, aircraft, and the like. Compact heat exchange surfaces are used in these applications to extract heat from a process fluid. The fluids involved may be gas or liquid.

Compact heat transfer apparatus have been constructed for use with such heat-generating apparatus and processes. These heat transfer apparatus are typically known as heat exchangers. Heat exchangers include a plurality of heat transfer surfaces for exposing the heated process fluid to the refrigerant fluid. Compact heat exchangers are generally characterized as having extended surfaces for transfer of heat. The most common configurations are known in the industry as either a plate-fin or a tube-fin type of surface. The fins provide significantly large surface area-to-volume ratios to facilitate heat transfer. Although both types of heat exchangers function to extract heat from the process fluid, the types have significant differences. Of the two types, plate-fin devices typically exhibit a significantly higher ratio of heat transfer surface to volume of heat exchanger. The process fluid flowing through the heat exchanger typically is in laminar flow against the heat transfer surfaces. Laminar flow enhances heat transfer by conduction across the fluid film on the plate.

Tube-fin type heat exchangers in contrast typically exhibit turbulent flow in the process fluid. The turbulent flow is imposed by the shape and the relatively off-set relationship of the tubes that carry the refrigerant fluid. Turbulent flow impedes heat transfer by conduction across the inherent film boundary.

Typically, either type is found in a single stage heat exchanger which is designed for the specific requirements of the apparatus and process to be cooled. The heat exchangers provide the plurality of tubes or plates through which the refrigerant fluid flows. The refrigerant may be returned across the flow path of the process gas typically once or perhaps twice. The number of plates or tubes depend on the cooling capacity required for the apparatus or process.

Heat exchangers typically comprise a housing having a process fluid inlet and a process fluid outlet. The process fluid typically flows in a cross-direction to the refrigerant flow through the plates or tubes. A heat exchanger having two or more sections, or stages, of stacked plate or tube elements has been described previously. For example, U.S. Pat. No. 3,746,084 describes a housing that encloses several sections of stacked refrigerant pipes. Each section includes a separate input and output header for the refrigerant supplied to that section. This heat exchanger, however, does not provide a rigorous flow path for the process fluid. The header is exposed to the process fluid.

While functioning to extract heat from the process fluid, the heat exchanger has several drawbacks. Nonuniformity of heat extraction leads to purity problems of the resulting cooled process fluid. Heat exchangers particularly are used in condensers which extract waste liquid and contaminants and thereby purify the process fluid. The nonuniformity of the thermal transfer and the unrigorous flow path for the process fluid may result in untreated process fluid moving through the heat exchanger. Untreated process fluid retains the contaminants and thus the purity of the resulting process fluid is not as great. For example, methane gas typically emits from a land fill. The gas is generated by decaying debris placed in the landfill. The methane gas further contains contaminants that are emitted by the decaying materials. These contaminants include chlorinated hydrocarbons, aromatics, and organic silicon compounds, among others. The heat exchanger cools the methane gas to condense water from the gas. The contaminants condense into the water. The water drains from the heat exchanger to a collector. A separator may be used to divide the contaminants for separate collection. The open design and nonuniform thermal transfer may lead to short circuiting and inefficient or ineffective cooling of the process fluid.

As discussed above, the size of the heat exchanger is dependent upon the capacity required for treating the process fluid. To facilitate economies of scale, standard sized heat exchangers are typically available from manufacturers. The heat exchanger is selected based on using the smallest capacity to meet the expected BTU per hour extraction requirements of the apparatus or process. This results in the heat exchanger typically having over-capacity for the expected work. This provides a margin of error for the heat exchanger. However, over-capacity contributes to inefficiencies in operation. For example, the pressure drop of the process fluid passing through the heat exchanger may be significantly great that additional pumping mechanisms are necessary to maintain the flow of the process gas.

Thus, there is a need in the art to provide heat exchange modules that are grouped to define a rigorous flow path for treating a process fluid with refrigerant fluid supplied to the heat exchange modules in parallel, for increasing the uniformity of heat exchange across the flow path.

SUMMARY OF THE INVENTION

The present invention overcomes the problems of the prior art by providing a heat exchanger that increases the uniformity of heat exchanged across a flow path between a process fluid and a refrigerant fluid. The heat exchanger comprises an aligned and stacked first group of at least one plate-fin heat exchange module and a second group of at least one plate-fin heat exchange module. Each heat exchange module comprises an inlet distribution manifold for receiving a refrigerant fluid from a supply and a discharge distribution manifold for communicating the refrigerant fluid to the supply. The modules each include a core that is defined by a plurality of parallel closely spaced-apart plates brazed to the inlet and discharge manifolds. The plates define a first group of discrete channels for flow of a process fluid in a first direction through the core and a second group of discrete channels for flow of the refrigerant fluid through the core transverse to the flow of the process fluid. The channels alternate in series whereby a channel for the process fluid is adjacent a channel for the refrigerant fluid. The channels for the process fluid open along transverse edges of the plates for receiving and discharging the process fluid from the core. The channels for the refrigerant fluid open at longitudinal ends to the intake manifold and the discharge manifold for communicating the refrigerant through the core. The plates extend substantially the full width between planes defined by an inlet side of the core for receiving the process fluid and a discharge side of the core, whereby a rigorous flow path is defined by the discrete channels through the module from the inlet side to the discharge side. The modules are stacked and sequenced alternately with one of the modules of the first group adjacent one of the modules of the second group. The modules communicate with the supply of the refrigerant fluid such that the refrigerant fluid flows in the transverse direction through the modules of the first group and in an opposite transverse direction through the modules of the second group. Supply means communicates the refrigerant from the supply to the inlet distribution manifolds of the first and the second groups of modules. Discharge means communicates the refrigerant from the outlet distribution manifolds of the first and the second groups of modules to the supply. The process fluid, being communicated through a flow path defined by the channels in the respective heat exchange modules, transfers thermal energy substantially uniformly across adjacent pairs of the modules.

Objects, advantages and features of the present invention will become apparent from a reading of the following detailed description of the invention and claims in view of the appended drawings.

DETAILED DESCRIPTION OF THE PREFERRED EMBODIMENT

Figure 1:
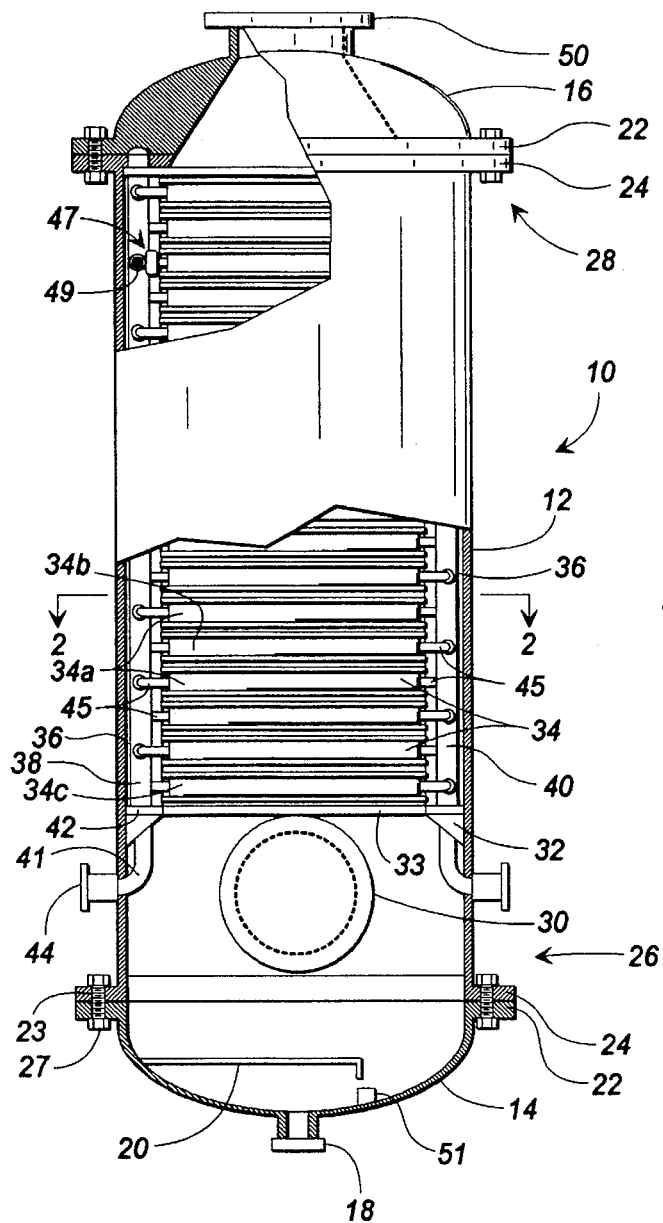
FIG. 1 is a cut-away side elevational view of a preferred embodiment of a heat exchanger for a process fluid.

Referring now in more detail to the drawing, in which like numerals indicate like parts throughout the several views, FIG. 1 illustrates a partially cut-away side elevational view of a preferred embodiment of a heat exchanger 10 for extracting heat from a fluid. The heat exchanger 10 comprises a vessel made of a cylindrical shell 12 closed by end caps 14 and 16. The vessel preferably is pressure and vacuum rated. The end caps 14 and 16 can be elliptical, ASME, or dished-head configuration. As illustrated, the end caps 14 and 16 have a gradually reducing taper. The end cap 14 comprises a collector for receiving condensate from the heat exchanger 10. The end cap 14 includes an axially-disposed drain and coupling 18 for communicating condensate from the end cap 14 to a condensate discharge from the apparatus that includes the heat exchanger 10. In the illustrated embodiment, a baffle or separator 20 attaches to the interior of the end cap 14. The collection and separation functions that the end cap 14 performs are well known in the industry. An annular flange 22 extends outwardly around the perimeter of an open end of the cap 14. The flange 22 includes a plurality of spaced-apart bores (not illustrated) for receiving bolts 23, as discussed below, for securing the caps 14 and 16 to the shell 12.

An annular flange 24 extends outwardly at each of a lower end 26 and an upper end 28 of the shell 12. The flanges 22 have a plurality of bores, each for receiving one of the bolts 23 therethrough. The end caps 14 and 16 align with the shell 12. The bolts 23 pass through the bores in the flanges 22 and 24 and receive nuts 27 to rigidly connect the end caps 14 and 16 to the shell 12.

A nozzle 30 connects to a bore in the shell 12 for an inlet for the process fluid into the shell. The nozzle 30 connects to a supply of process fluid to be passed through the heat exchanger 10. The end cap 16 includes a nozzle 50 for communicating a process fluid from the heat exchanger 10.

An annular flange 32 mounts to the interior wall of the shell 12 in the lower end 26. The flange 32 supports a plate 33, discussed below. The plate 33 and the flange 32 support a plurality of heat exchange modules 34 stacked together in a column. The plate 33 connects to the lowermost heat exchanger 34c, as discussed below.

Figure 2:
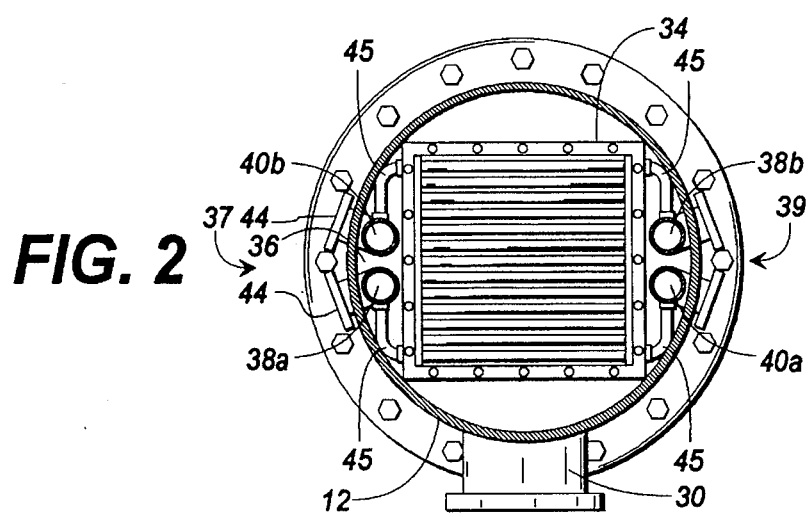
FIG. 2 is a top plan view of the heat exchanger taken along lines 2—2 of FIG. 1.

The column of heat exchange modules 34 define a plurality of annular cavities 36 between the sides of the modules and the interior wall of the shell 12. The annular cavities 36 hold two pairs of a supply header 38 and a discharge header 40. FIG. 2 illustrates a preferred arrangement of the headers 38 and 40 in the cavities 36 on a first side 37 and an opposite side 39 of the shell 12. In an alternate embodiment, not illustrated, the headers 38 and 40 are spaced-apart on a radius on the opposite sides of the shell 12. The supply headers 38 communicate refrigerant fluid from a supply (not illustrated) to the heat exchange modules 34. The discharge headers 40 receive the refrigerant fluid from the heat exchange modules 34 for return to the supply.

The headers 38 and 40 are elongate pipes that extend through bores (discussed below) in the plate 33. A lower end 42 of each header 38 and 40 connect to a respective tube 41 which is received by a flange 44 in the sidewall of the shell 12. The headers 38 and 40 communicate with a supply (not illustrated) of a refrigerant fluid. A preferred embodiment provides a threaded connector at the lower end 42 which couples with the flexible tube 41 to the flange 44. As best illustrated in FIG. 2, the supply header 38a on the first side 37 of the shell 12 communicates with the discharge header 40a on the opposite second side 39 of the shell 12, as discussed below. In an alternate embodiment, the supply header 38a is on the same side of the shell 12 as is the discharge header 40a.

The supply header 38 and the discharge header 40 communicate with the heat exchange modules 34 through connection hoses 45. One supply header 38a communicates with a first group of heat exchange modules 34a. The second supply header 38b communicates with a second group of heat exchange modules 34b. The modules 34 are disposed in alternating sequence in the column, such that one of the modules 34a in the first group is adjacent one of the modules 34b in the second group. The inlets of each heat exchange module 34 (discussed below) are disposed on alternating sides of the shell 12. The refrigerant fluid flows in a first direction through the modules 34a of the first group and flows in a second opposite direction through the modules 34b of the second group.

An alternate embodiment of the present invention includes a flow meter 47 and a valve 49 on each connection hose 45 between the supply header 38 and the heat exchange module 34. For convenience, FIG. 1 illustrates the flow meter 47 and the valve 49 on one of the connection hoses 45. The flow meters communicate with a controller, such as a microprocessor, to monitor refrigerant flow through the respective heat exchange modules 34. If the flow rate for a module 34 is excessive, the valve 49 can be closed to shut off fluid flow through the heat exchange module. Excessive flow would indicate a leak or other problem with the heat exchange module. Closing the valve 49 permits the heat exchanger 10 to continue operating, until such time as the process can be stopped and repairs made to the particular heat exchange module.

In an alternate embodiment, a sensor 51 is fixed to a lower portion of the end cap 14. The sensor monitors the condensate. Upon detecting the presence of the refrigerant fluid in the condensate, a signal can be sent to indicate a leak in the heat exchanger.

Figure 3:
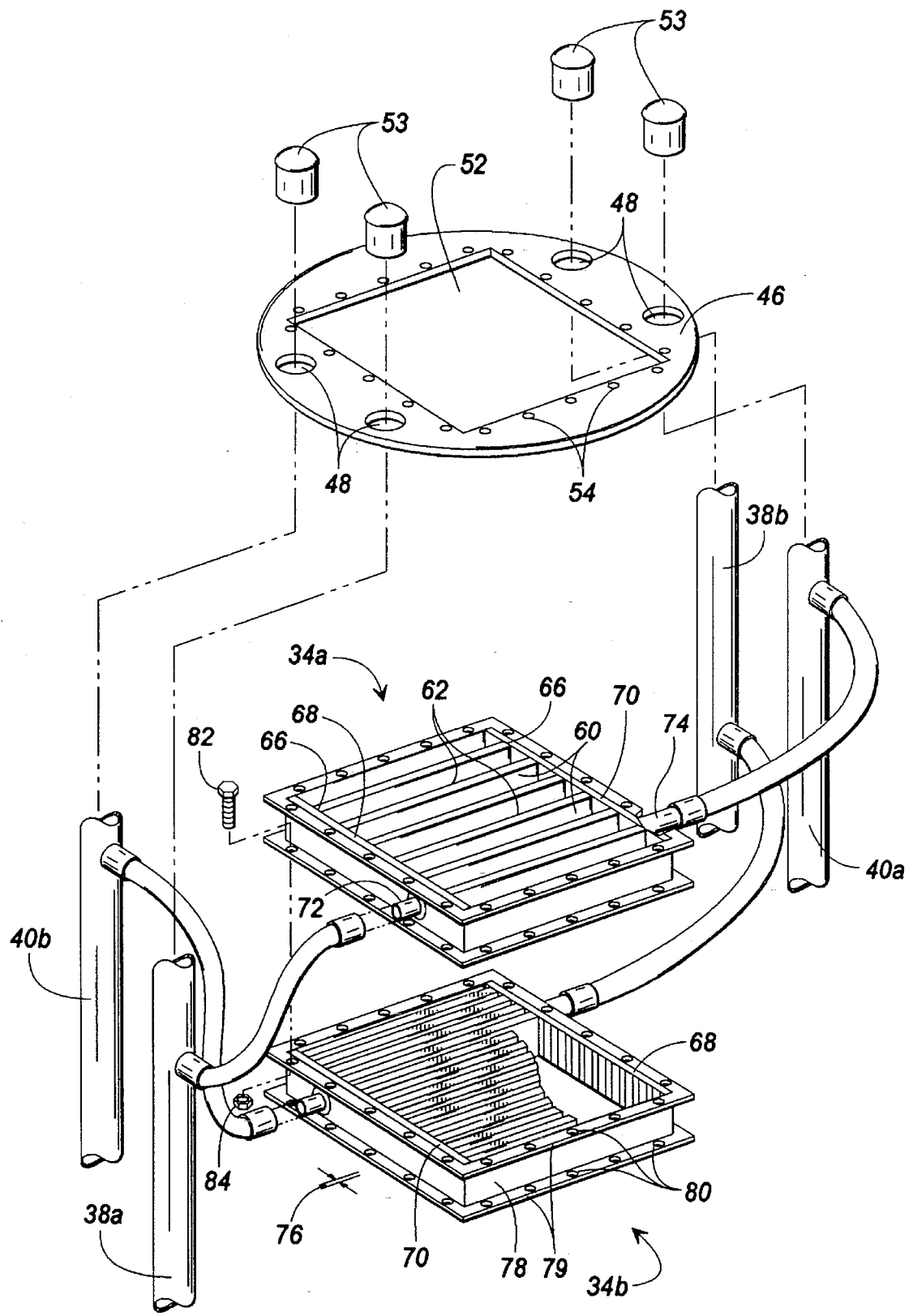
FIG. 3 is an exploded perspective view of the heat exchange module for the heat exchanger illustrated in FIG. 1.

The plate 33 and a plate 46 close the lower end 26 and the upper end 28, respectively, of the shell 12. The plate 33 is identical in structure to the plate 46, and the following description of the plate 46 applies to the plate 33. FIG. 3 illustrates the upper plate 46 exploded from a pair of the modules 34a and 34b. The plate 46 includes a plurality of bores 48. Each bore 48 axially aligns with a respective one of the supply headers 38 and discharge headers 40. The bores 48 in the upper plate 46 are sized so that the headers 38 and 40 press-fit through the bores. The upper ends of the headers 38 and 40 are closed by a respective cap 53. A sealing material inserts in the bores 48 against the headers 38 and 40 to restrict passage of the process fluid into the annular cavities 36. The sealing material also inserts around the periphery of the plates 33 and 46 against the inner wall of the shell 12.

The plate 46 defines an opening 52 that corresponds in shape to the cross-section of the heat exchange modules 34. A plurality of bores 54 are disposed around the periphery of the opening 52. The bores 54 receive bolts for securing the plate 46 to the adjacent heat exchange module 34, as discussed below. The plate 33 similarly bolts to the heat exchange module 34 adjacent to it. The lower ends of the headers 38 and 40 extend through the bores 48 in the plate 33 for connection through the holes 41 to the respective coupler 44.

FIG. 3 further illustrates a perspective view of a pair of modules 34a and 34b exploded from the upper plate 46. The modules 34 are of plate-fin construction that are of brazed manufacture. The modules 34 are preferably rectangular. Each module 34 has plurality of pairs of spaced-apart thin plates 60 which are closed on the upper and lower (not illustrated) longitudinal edges 62 to define a channel for communicating the refrigerant fluid. The longitudinal ends 66 open into a intake manifold 68 and a discharge manifold 70. An inlet tube 72 connects to the intake manifold 68. A discharge tube 74 connects to the discharge manifold 70. The inlet tube 72 and the discharge tube 74 receive the respective connection hose 45 for communicating refrigerant fluid through the heat exchange module 34. In an alternate embodiment (not illustrated) the heat exchange modules 34 provide multiplane, multipass refrigerant flow through the plates.

The pairs of plates 60 are spaced-apart to define a gap 76 between adjacent pairs. The plurality of gaps 76 define a rigorous flow path through the heat exchange module 34. A separate fin (not illustrated) may be disposed in the gaps 76 to increase the surface area for thermal transfer. The column of heat exchange modules 34 provide a rigorous flow path through the heat exchanger 10 for the process fluid.

A U-shaped channel 78 attaches around the perimeter of each of the heat exchange modules 34. The channel 78 provides rigidity to the heat exchange module 34 and facilitates connecting adjacent modules together. The U-shaped channel 78 provides a pair of parallel flanges 79 that extend outwardly from the heat exchange module 34. Each flange 79 includes a plurality of spaced-apart bores 80. Each bore 80 receives a bolt 82 and a nut 84 for rigidly connecting together the adjacent heat exchange modules 34a and 34b. Similarly, bolts 82 extend through the bores in the plates 33 and 46 for rigidly connecting the respective plate to the lowermost and uppermost heat exchange modules 34 in the column. The plates 33 and 46, together with the firmly held headers 38 and 40, define a frame for holding the column of heat exchange modules 34. The frame and the bolt connections between adjacent heat exchange modules 34 allow easy removal of a selected module, for repair or replacement as necessary.

A seal (not illustrated) preferably inserts between the flanges 79 of adjacent heat exchange modules 34. The seal reduces the opportunity for fluid leaks between adjacent modules and thereby maintains the rigorous flow path for the process fluid through the column of modules. The seal preferably is a thin metal ribbon or a ribbon of polytetrafluoroethylene.

Figure 4:
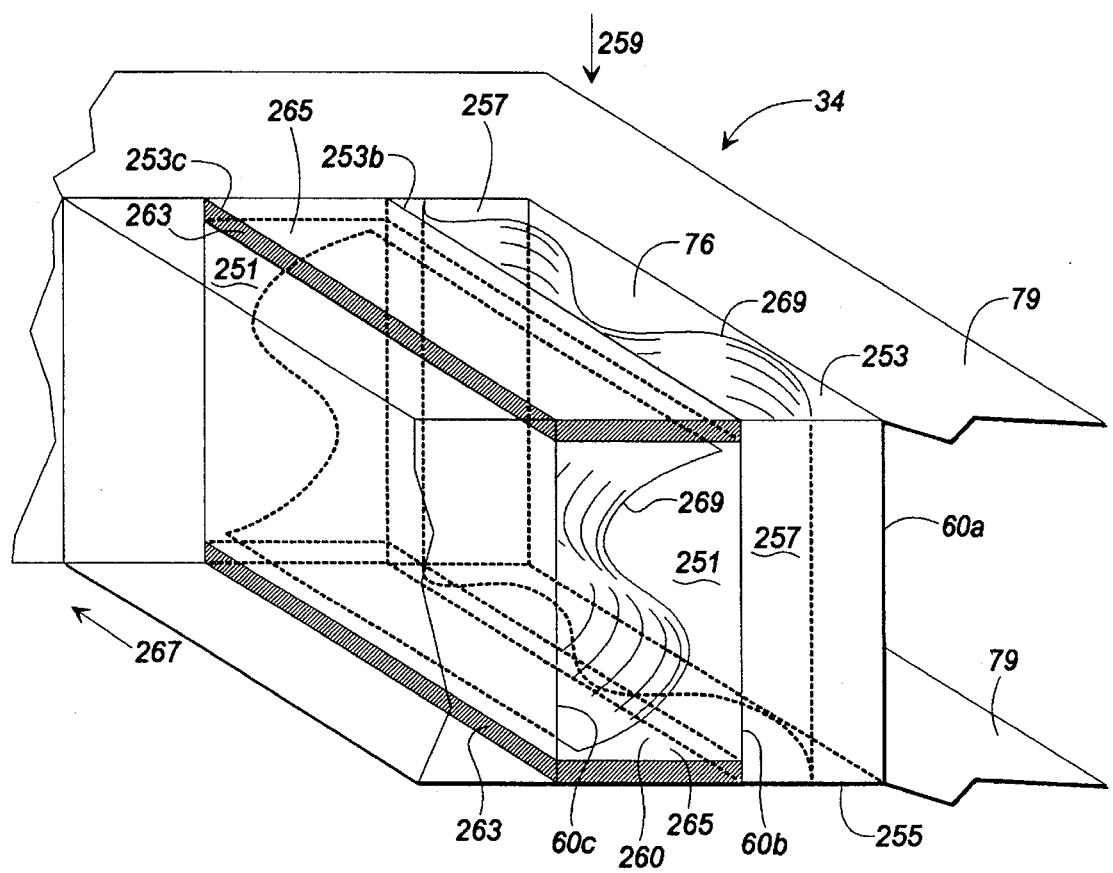
FIG. 4 is an enlarged perspective view of a portion of a module used in the heat exchanger illustrated in FIG. 1.

FIG. 4 is an enlarged perspective view of a portion of the module 34 to illustrate details of the present invention. The parallel plates 60 in the module 34 provide heat transfer surfaces generally designated 251 in a core through which the process fluid and refrigerant fluid flow on transverse paths. The plates 60 physically separate the two fluids. The adjacent plates 60a and 60b define one of the gaps 76 or channels for the process fluid. The upper and lower edges 253, 255 define openings across the core for the process fluid. The openings are in substantial alignment with planes defined by the flanges 79. A portion generally designated 257 of the intake manifolds 68 and the discharge manifolds 70 define closed opposing surfaces for the channels 76 for the process fluid which flows through the core in a direction indicated by the arrow 259.

The plates 60b and 60c define the channel 260 for the refrigerant fluid. The gaps between adjacent upper and lower edges 253b and 253c are closed by closure bars 263 which are brazed to the plates 60. The longitudinal ends 66 open into the intake manifolds 68 and the discharge manifolds 70 through slots generally designated 265. The refrigerant flows from the intake manifold 68 to the discharge manifold 70 in a direction indicated by the arrow 267 which is transverse to the direction of flow 259 of the process fluid.

As discussed above, fin stock 269 are preferably uniformly disposed between the plates 60. The illustrated fin stock has a corrugated shape; other surface designs can be used. The fin stock 269 is oriented in the direction of fluid flow alternately in the respective channels between the parallel separator plates 60. Each fin stock piece is closely fitted between the plates and has a length and width substantially the same as that for the plates 60 which extend the length and width between the channels 78 that define the perimeter of the module 34.

In one embodiment, the module 34 has overall dimensions of 6 inches high by 13 inches length and width defining a square in cross-sectional view. The flanges 78 extend 1.5 inches outwardly from the core defined by the separator plates 60 and the fin stock. The plates 60 are 0.020 inches aluminum sheet having a 10 inch length and a 6 inch width, thereby extending the full distance between the manifolds 68 and 70 and between the upper surfaces of the flanges 79. The fin stock 269 has a fin height of 0.020 inches which defines the spacing between the plates 60. The core is assembled by stacking fin stock and separator plates together in sequence and brazing. In this embodiment, the fin stock between the plates 60 comprises two pieces end-to-end and separated by an elongated narrow support bar which functions to support the plates from sagging and loss of their straight parallel relationship during brazing. The support bars are disposed with longitudinal axes parallel to the flow in the channel, with minimal interference to flow.

Each channel for the process fluid and the refrigerant fluid thereby formed by the plates 60 defines rigorous flow paths for the respective process and refrigerant fluids. The length of the flow path through the module 34 is consistent (small relative to the cross-section of the module), the hydraulic diameter is consistent, the channels maintain periodic and predictable turbulent flow patterns at set flowrates, and frictional pressure drops are substantially uniform channel-to-channel. The process fluid flows along the rigorous path through the module 34 within discrete channels 76 from an inlet side 271 to a discharge side 273. The process fluid does not migrate from channel to channel within each respective module. Similarly, the refrigerant fluid does not migrate channel to channel. This results in substantially uniform treatment of the process gas across a pair of stacked modules 34. The process fluid contacts the heat transfer surfaces 251 which communicate with the refrigerant fluid for thermal and mass transfer.

In operation, the heat exchanger 10 receives a process fluid through the inlet nozzle 30. The process fluid moves upwardly through the flow path defined by the column of heat exchange modules 34. It is to be appreciated by one of ordinary skill that the process fluid could also flow downwardly through the column and could flow laterally, depending on the orientation of the heat exchanger 10. The flange 32 and the lower plate 33 direct the process fluid into the heat exchange modules 34 through the opening 52 in the plate 33. The flow of the process fluid across the plates 60 is laminar in the gaps 76 between the plates.

The refrigerant fluid flows through the pairs of plates 60 in a cross-direction to the flow of the process fluid. The process fluid contacts the plates 60 which are chilled by the refrigerant fluid. The contact transfers heat from the process fluid to the refrigerant fluid as the process fluid flows through the column of heat exchange modules 34.

Each heat exchange module 34 receives refrigerant fluid in parallel from the supply header 38. In the illustrated embodiment, two supply headers 38a and 38b feed two groups of modules 34a and 34b respectively. The modules 34 are disposed so that the inlet tubes 72 for the first group of modules 34a are on the first side 37 of the shell 12 and the inlet tubes 72 for the second group of modules 34b are on the opposite second side 39 of the shell 12. The refrigerant fluid flows in the first direction through the modules 34a and flows in the second opposite direction through the modules 34b.

The parallel feed and the alternating direction of refrigerant feed to the modules 34 facilitates increased uniformity of thermal transfer between the fluids. The process fluid is uniformly cooled across the heat exchange modules for each pair of modules 34a and 34b. The present invention therefore provides substantially uniform cooling of the process fluid as it flows through the column of heat exchange modules.

For example, in one of the modules 34a the refrigerant fluid flows in a first direction from the first side 37 to the opposite second side 39. The process fluid on the first side 37 contacts a portion of the plates 60 that are colder than the portions of the plates on the second side 39. The first side 37 in the module 34a has potential for more thermal transfer than the second side 39. In the adjacent heat exchange module 34b, the refrigerant enters on the second side 39 and exits on the first side 37. The process fluid flowing through the module 34b on the second side 39 thereby contacts portions of the plates 60 which are colder than the portions on the first side 37. However, after the process fluid has passed through the two adjacent heat exchange modules 34a and 34b, the temperature difference in the process fluid across the cross-section of the heat exchange modules 34 is substantially uniform.

Substantial uniformity of temperature difference in the process fluid promotes uniform condensation of contaminants from the process fluid. Laminar flow through the column increases the overall efficiency of heat transfer. Fewer heat exchange modules are therefore necessary to effect a given temperature change for a process fluid. Fewer heat transfer modules decreases the pressure drop of the process fluid flowing through the heat exchanger. Communicating refrigerant fluid in parallel to the heat exchange modules results in a relatively small change in temperature for the refrigerant fluid. These advantages provided by the present invention further reduce the operating cost and the capital cost of the heat exchanger.

The example discussed below illustrates the design of a heat exchanger 10 according to the present invention. The process fluid is methane gas, such as would be emitted by a landfill. The heat exchanger 10 produces a purified methane gas. The methane gas includes water vapor and contaminants. Each heat exchange module reduces the temperature of the methane gas and condenses some water vapor from the methane gas. The condensate absorbs the contaminants, thereby holding them in the water solution. The condensate drains down the plates 60 to the end cap 14 for separation and discharge through the drain 18.

In this example, the refrigeration fluid is 10% glycol. The heat exchange modules 34 are ten-plate units model 1E2629 manufactured by Modine Manufacturing Company, Racine, Wis. The modules are rectangular and have an approximate cross-sectional area of 1.66 square feet. During the design, computations are made to determine the change in temperature for the methane gas that flows through the plurality of the heat exchange modules 34. The modules will then be stacked in a column according to the present invention, whereby the first group of modules 34a communicate in parallel with the supply header 38a and the discharge header 40a. The second group of modules 34b communicate with the supply header 38b and the discharge header 40b. The modules 34a and 34b alternate in the column.

The fluid rate of the refrigerant is determined to be 12,510 pounds per hour, as determined below:

$$M = 25 \text{ gallons per minute} \times 60 \text{ minutes per hour} \times$$
$$8.34 \text{ pounds per gallon}$$
$$= 12,510 \text{ pounds per hour}$$

The 25 gpm is based on the manufacturers minimum recommended flow rate per plate to achieve good laminar flow. Such information is typically provided in graph form by the manufacturer of the module.

The initial temperature of the methane gas entering the first module is 75° F. The temperature of the glycol refrigerant fluid is 34° F. The methane gas cools as it passes through the module 34. The cooled process gas exits one heat exchange module 34a and immediately enters the adjacent heat exchange module 34b for continued cooling. The condensate absorbs contaminants for purifying the methane gas.

The method described below determines the change in temperature for the process fluid in the heat exchange module 34. First, the temperature of the process fluid exiting the heat exchange module ($T_O$) is computed. The value $T_O$ equals the temperature of the process fluid entering the module ($T_i$) minus the change in temperature ($\Delta T_p$). The change in temperature $\Delta T_p$ is estimated. The estimate of $\Delta T_p$ may have to be changed after the computations are made for the particular module. It is necessary to change the estimate and recompute because a particular estimated change in temperature may mathematically indicate that a greater mass of water is condensed than could actually be achieved. Also, the estimate may need to be changed if the computations indicated less mass of water is condensed than would be actually achieved.

Second, the water content of the process fluid exiting the module is then determined. The amount of water condensed in the particular heat exchange module equals the difference between water content of the process fluid entering the heat exchange module and the water content of the process fluid exiting the heat exchange module. The amount of water in the process fluid exiting the heat exchange module equals the water content at $T_O$ times the dry gas amount. For methane gas, the dry gas amount was assumed to be close to that of air, or 0.016 pounds of water per pound of gas. It may be appreciated that the water content exiting a particular heat exchange module equals the water content of the process fluid entering the next adjacent heat exchange module.

Third, the amount of water condensed ($M_c$) is used in a formula below to balance the known total heat gain with the sensible heat and the latent heat. Solving the formula results in a computed value ($\Delta T_c$) for the change in temperature of the process fluid. The computed value is used to verify the estimated change in temperature $\Delta T_p$. In this formula, the heat exchange rate Q' equals the sensible heat lost plus the latent heat. In other words, the heat exchange rate equals the total dry process fluid times the specific heat of the refrigerant fluid at an average module temperature times the change in temperature $\Delta T_c$ plus the heat of vaporization measured at an average temperature for the module times the amount of water condensed in the module. The formula is balanced to determine $\Delta T_c$.

$$Q' = [M_p \times C_p^o \times \Delta T_c] + [\Delta H_v \times M_c]$$

If the computed change in temperature $\Delta T_c$ from the formula equals the estimated $\Delta T_p$, then the computations for the particular module are finished. The temperature of the process fluid exiting the module is known, and this becomes the temperature of the process fluid entering the adjacent module.

If the computed change in temperature exceeds the estimated $\Delta T_p$, then the estimated change in temperature $\Delta T_p$ must be increased and the amount of water condensed in the heat exchange module recomputed. This is because the computations using that particular estimated change in temperature $\Delta T_p$ are based on condensing a greater amount of water than could actually be extracted by the module as the process fluid flows through.

If the computed change in temperature is less than the estimated $\Delta T_p$, then the estimated change in temperature $\Delta T_p$ must be lowered because a smaller amount of water was computed as being condensed than actually would be extracted from the process fluid.

This method described above is repeated for an additional heat exchange module until the exit temperature of the process fluid in the module reaches or exceeds the target temperature. The modules are stacked in sequence with the inlet tube 72 alternating on the first side and the second side of the shell 12. The modules 34a having the inlet tubes 72 on a first side of the shell 12 connect in parallel to the supply header 38a. The discharge tube 74 from these modules 34a connect in parallel to the discharge header 40a. Similarly, the alternating group of modules 34b connect in parallel to the supply header 38b on the second side of the shell 12. The discharge tubes of the modules 34b connect in parallel to the discharge header 40b.

The table below lists the rate of change Q' in heat for the methane gas which enters a module n in the column of modules, where n is the sequence number of the module in the column. The rate of change in heat Q' is in terms of BTU per minute. The change in the temperature of the process fluid $\Delta T_p$ is listed in degrees Fahrenheit. The sum of the change in temperature $\Sigma \Delta T_p$ shows the change in the temperature in degrees Fahrenheit as the process fluid flows through the column.

| Module | Q' | $\Delta T_p$ | $\Sigma \Delta T_p$ |
|---|---|---|---|
| 1 | 328 | 5 | 5 |
| 2 | 288 | 4.7 | 9.7 |
| 3 | 250.4 | 4.5 | 14.2 |
| 4 | 214.4 | 4.15 | 18.35 |
| 5 | 181.2 | 3.75 | 22.1 |
| 6 | 151.2 | 3.3 | 25.4 |
| 7 | 124.8 | 2.85 | 28.25 |
| 8 | 102.0 | 2.4 | 30.65 |
| 9 | 82.8 | 2.0 | 32.65 |
| 10 | 66.8 | 1.69 | 34.34 |
| 11 | 58.6 | 1.35 | 35.69 |
| 12 | 42.8 | 1.11 | 36.8 |
| 13 | 34.0 | 0.9 | 37.7 |
| 14 | 26.5 | 0.7 | 38.4 |
| 15 | 26.2 | 0.55 | 38.95 |

The above method has designed a 15 module heat exchanger 10 for cooling methane gas from 75° to approximately 36° F. Condensate driven from the methane gas absorbs contaminants and the contaminants in the condensate are removed through the drain 18 of the heat exchanger for disposal. The purified methane gas exits the heat exchanger 10 through the coupler 50 for subsequent processing.

The foregoing disclosure has described a preferred embodiment of an apparatus and method for transferring thermal energy from a process fluid to a refrigerant fluid. The disclosed embodiment accordingly cools the process gas that moves through the flow path between the plates 60. The apparatus could also function as a heater. In this alternate embodiment, the process fluid and the refrigerant fluid are switched. The process fluid flows through the channels defined by the pairs of plates 60. The refrigerant fluid flows through the gaps 74 in the modules 34. An example is an oil fluid heater. The first fluid, or the process fluid, is an oil. The oil circulates from a supply across a heating element and through the heat exchange modules. The second fluid is a gas, air for example, which flows through the gaps between the plates of the heat exchange module. The apparatus and method of the present invention accordingly is either a chiller or a heater for transferring thermal energy between a first fluid and a second fluid.

The principles, preferred embodiments, and modes of operation of the present invention have been described in the foregoing specification. The invention is not to be construed as limited to the particular forms disclosed because these are regarded as illustrative rather than restrictive. Moreover, variations and changes may be made by those skilled in the art without department from the spirit of the invention as described by the following claims.

What is claimed is:

1. A heat exchanger for transferring thermal energy between a process fluid and a refrigerant fluid, comprising:

an aligned and stacked first group of at least one plate-fin heat exchange module and a second group of at least one plate-fin heat exchange module, each heat exchange module comprising:

an inlet distribution manifold for receiving a refrigerant fluid from a supply;

a discharge distribution manifold for communicating the refrigerant fluid to the supply;

a core defined by a plurality of parallel closely spaced-apart plates brazed to the inlet and discharge manifolds to define a first group of discrete channels for flow of a process fluid in a first direction through the core and a second group of discrete channels for flow of the refrigerant fluid through the core transverse to the flow of the process fluid, the channels alternating in series whereby a channel for the process fluid is adjacent a channel for the refrigerant fluid, the channels for the process fluid open along transverse edges of the plates for receiving and discharging the process fluid, the channels for the refrigerant fluid open at longitudinal ends to the intake manifold and the discharge manifold for communicating the refrigerant through the core, the plates extending substantially the full width between planes defined by an inlet side of the core for receiving the process fluid and a discharge side of the core, whereby a rigorous flow path is defined by the discrete channels through the module from the inlet side to the discharge side;

fin stock sheets fixed between adjacent plates and oriented with the respective direction of flow through the respective channel defined by the plates, whereby thermal communication between the process fluid and the refrigerant fluid is facilitated;

the modules stacked and sequenced alternately with one of the modules of the first group adjacent one of the modules of the second group and communicating with the supply of the refrigerant fluid such that the refrigerant fluid flows in the transverse direction through the modules of the first group and in an opposite transverse direction through the modules of the second group;

supply means for communicating the refrigerant from the supply to the inlet distribution manifolds of the first and the second groups of modules;

discharge means for communicating the refrigerant from the outlet distribution manifolds of the first and the second groups of modules to the supply;

whereby the process fluid, being communicated through a flow path defined by the channels in the respective heat exchange modules, transfers thermal energy substantially uniformly across adjacent pairs of the modules.

2. A method of transferring thermal energy between a process fluid and a refrigerant fluid flowing at cross directions through a heat exchanger, comprising:

communicating a refrigerant fluid from a supply through supply headers to an aligned and stacked first group of at least one plate-fin heat exchange module and a second group of at least one plate-fin heat exchange module, each heat exchange module comprising:

an inlet distribution manifold for receiving a refrigerant fluid from a supply;

a discharge distribution manifold for communicating the refrigerant fluid to the supply;

a core defined by a plurality of parallel closely spaced-apart plates brazed to the inlet and discharge manifolds to define a first group of discrete channels for flow of a process fluid in a first direction through the core and a second group of discrete channels for flow of the refrigerant fluid through the core transverse to the flow of the process fluid, the channels alternating in series whereby a channel for the process fluid is adjacent a channel for the refrigerant fluid, the channels for the process fluid open along transverse edges of the plates for receiving and discharging the process fluid, the channels for the refrigerant fluid open at longitudinal ends to the intake manifold and the discharge manifold for communicating the refrigerant through the core, the plates extending substantially the full width between planes defined by an inlet side of the core for receiving the process fluid and a discharge side of the core, whereby a rigorous flow path is defined by the discrete channels through the module from the inlet side to the discharge side;

fin stock sheets fixed between adjacent plates and oriented with the respective direction of flow through the respective channel defined by the plates, whereby thermal communication between the process fluid and the refrigerant fluid is facilitated; and the modules stacked and sequenced alternately with one of the modules of the first group adjacent one of the modules of the second group and communicating with the supply of the refrigerant fluid such that the refrigerant fluid flows in the transverse direction through the modules of the first group and in an opposite transverse direction through the modules of the second group; and communicating a process fluid from a process fluid supply through the first groups of discrete channels for the process fluid in the aligned stack of modules, whereby the process fluid, being communicated through a flow path defined by the channels in the respective heat exchange modules, transfers thermal energy substantially uniformly across adjacent pairs of the modules.

* * * * *